United States Patent
Komiya et al.

(10) Patent No.: US 7,388,597 B2
(45) Date of Patent: Jun. 17, 2008

(54) BEAM LIGHT SCANNING DEVICE AND IMAGE FORMING APPARATUS USING SAME

(75) Inventors: Kenichi Komiya, Kanagawa-ken (JP);
Koji Tanimoto, Shizuoka-ken (JP);
Daisuke Ishikawa, Shizuoka-ken (JP);
Yuji Inagawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 403 days.

(21) Appl. No.: 11/025,950

(22) Filed: Jan. 3, 2005

(65) Prior Publication Data
US 2005/0157159 A1    Jul. 21, 2005

(30) Foreign Application Priority Data
Jan. 15, 2004   (JP)   ............................. 2004-008521

(51) Int. Cl.
*B41J 2/47*   (2006.01)
*G02B 26/10*  (2006.01)

(52) U.S. Cl. ...................... 347/250; 347/235
(58) Field of Classification Search ................ 347/237, 347/247, 235, 250
See application file for complete search history.

(56) References Cited

U.S. PATENT DOCUMENTS 4,999,718 A    3/1991   Arai
6,462,855 B1   10/2002  Komiya et al.
7,030,900 B2 * 4/2006   Komiya et al. ............. 347/239

FOREIGN PATENT DOCUMENTS

| CN | 1118890 A | 3/1996 |
|---|---|---|
| JP | 9-68662 A | 3/1997 |
| JP | 9-109447 A | 4/1997 |
| JP | 2001-91873 A | 4/2001 |
| JP | 2002-19186 A | 1/2002 |
| JP | 2003-25629 A | 1/2003 |

OTHER PUBLICATIONS

U.S. Appl. No. 10/617,029, filed Jul. 11, 2003, Komiya et al.

* cited by examiner

*Primary Examiner*—Huan H Tran
(74) *Attorney, Agent, or Firm*—Foley & Lardner LLP

(57) ABSTRACT

A beam light scanning device includes an image data processing unit operable to output image-processed data of neighboring pixels in such a way that the data is divided for distribution into first pixel data and second pixel data. The scanner also includes a synchronizer circuit that receives the first and second pixel data as output from the image data processor and outputs these pixel data while letting them be synchronized with clocks as synchronized based on a horizontal synchronous signal. The scanner further includes a couple of pulse width modulators or "PWMs", a synthetic circuit, and a laser diode module. The PWMs are for adjustment of the pulse widths of the first and second pixel data as output from the synchronizer circuit respectively. The synthetic circuit combines together the pulse width-adjusted first and second pixel data. The LD emits a light beam indicative of the resultant combined pixel data.

12 Claims, 10 Drawing Sheets

BEAM LIGHT SCANNING DEVICE AND IMAGE FORMING APPARATUS USING SAME

FIELD OF THE INVENTION

The present invention relates to a beam light scanning device and image forming apparatus using the scanner device.

BACKGROUND OF THE INVENTION

Image forming apparatus of the type using electrophotography techniques is equipped with a beam light scanning device. The beam light scanner device has its light source, which is arranged by light-emitting elements such as laser diodes (LDs). In recent years, attempts are made to employ a plurality of LDs in order to speed up image formation operations. Output beams of individual LDs are guided to pass through a half mirror structure so that these are bundled together into substantially a single laser beam with prespecified beam intervals in a predetermined direction. The bundled laser beam is then guided to fall onto a polygon mirror.

An example of this scheme is disclosed, for example, in Japanese Laid-Open Patent Application No. 2001-91873 (FIGS. 1 and 7).

Unfortunately, the apparatus as taught thereby is faced with a problem which follows. Commercially available LDs for use as the light-emitting elements that emit beams of light are high in purchasing price in the marketplace. Thus, the use of an increased number of such LDs as the light emission means would result in an increase in production costs of a beam light scanner device and an image forming apparatus using such scanner.

SUMMARY OF THE INVENTION

It is therefore an object of this invention to avoid or mitigate the above-noted problem. It is another object of the invention to provide a technique for reducing production costs while at the same time enabling achievement of high-speed light emission performances for image formation by using a reduced number of light emission means.

In accordance with one aspect of the invention, a beam light scanning device is provided which includes an image data processor unit operable to output image data of neighboring pixels while dividing for alternate distribution the data into first pixel data and second pixel data. The scanner device also includes an adjuster unit that applies specified adjustment to the first pixel data and the second pixel data as output from the image data processor unit. The scanner further includes a synthesis unit for combining together the adjusted first and second pixel data as output from the adjuster unit, and a light emission unit that is operatively responsive to receipt of the pixel data as output from the synthesis unit, for emitting light as a scan beam.

DETAILED DESCRIPTION OF THE INVENTION

A first embodiment of the present invention will be described with reference to FIGS. 1 to 4 below.

Figure 1:
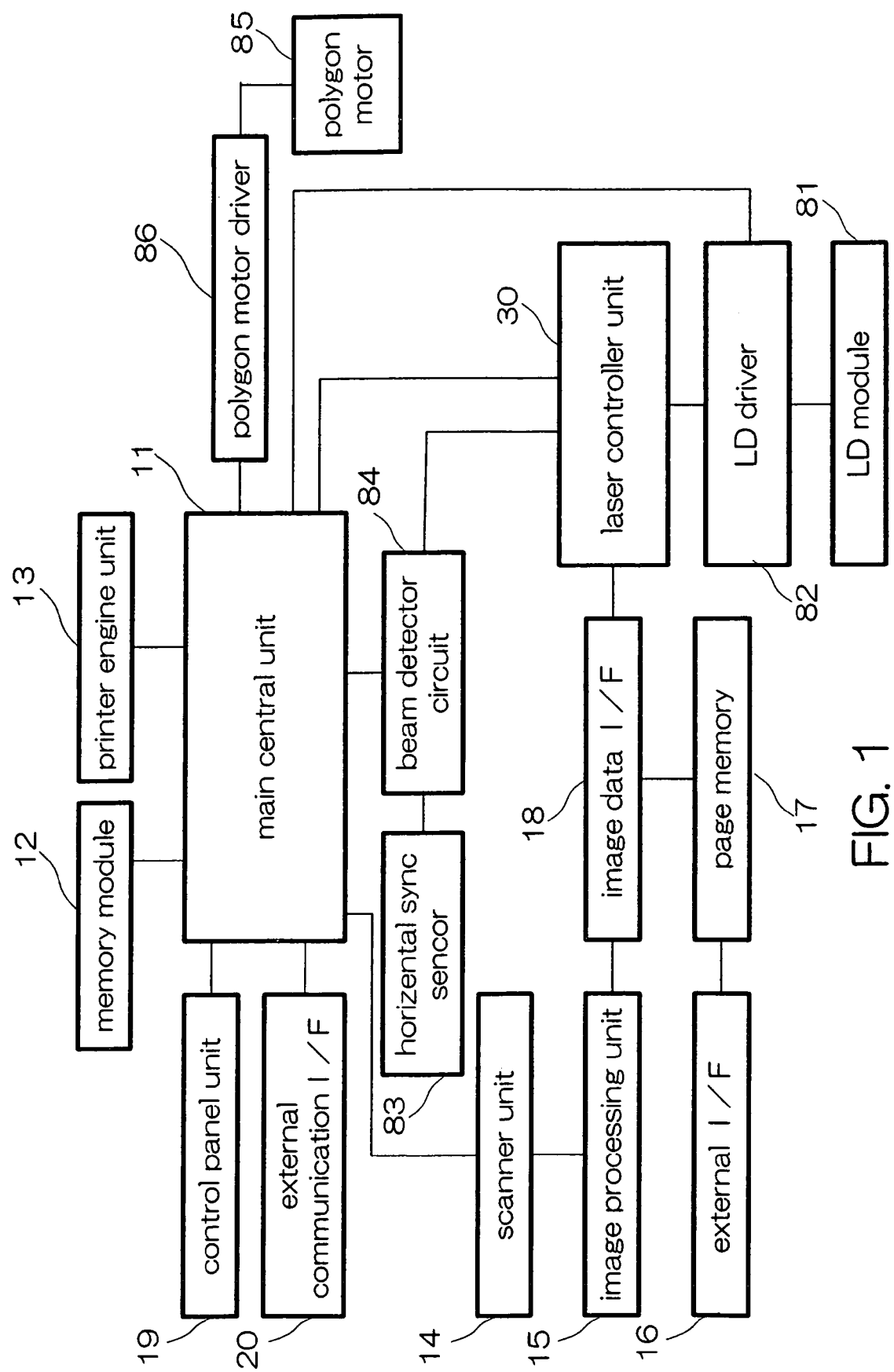
FIG. 1 is an electrical block diagram of an image forming apparatus in accordance with a first embodiment of the present invention.
Figure 2:
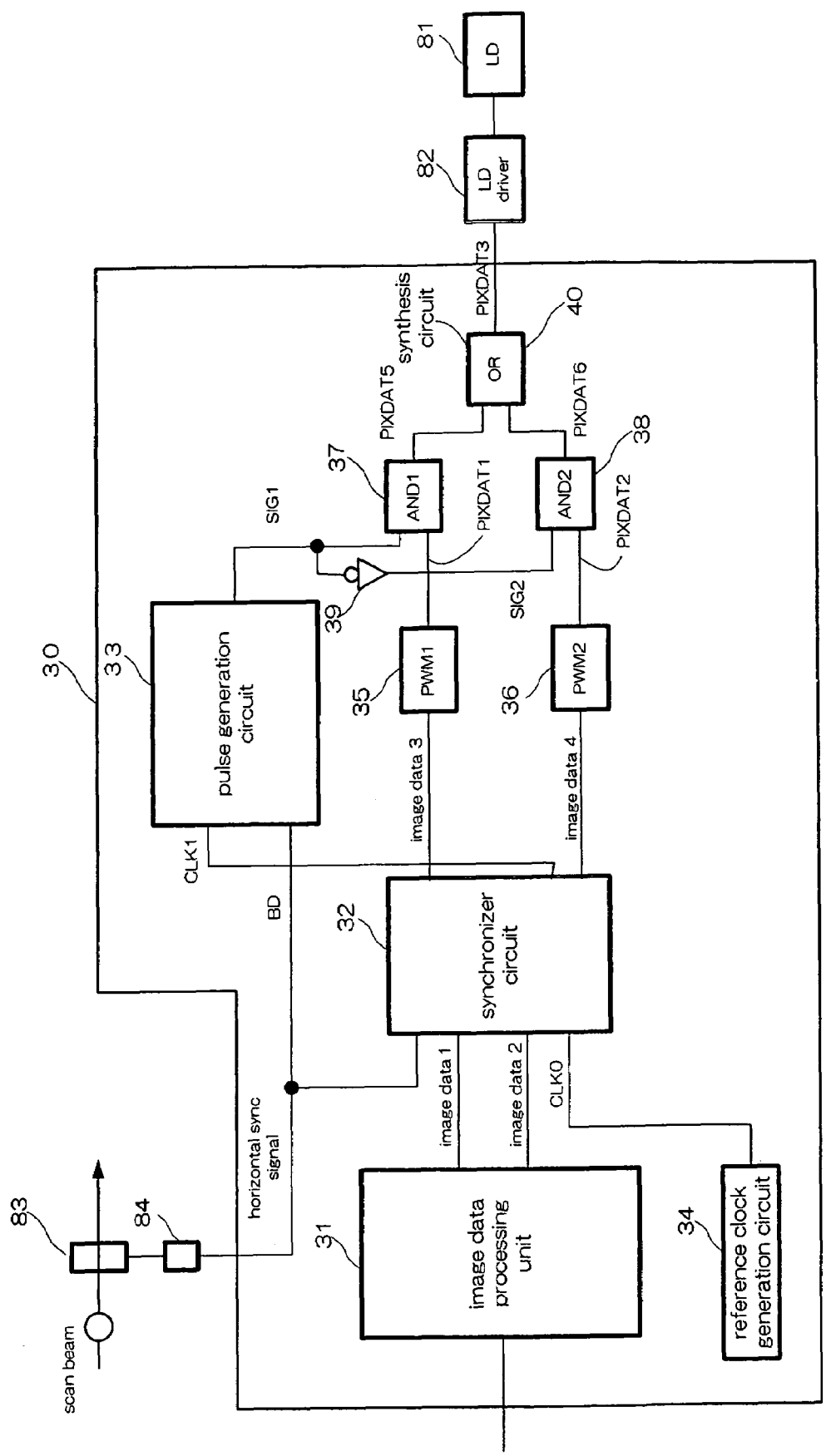
FIG. 2 is a diagram depicting a detailed configuration of electrical circuitry of part of a beam light scanning device in accordance with the first embodiment.
Figure 3:
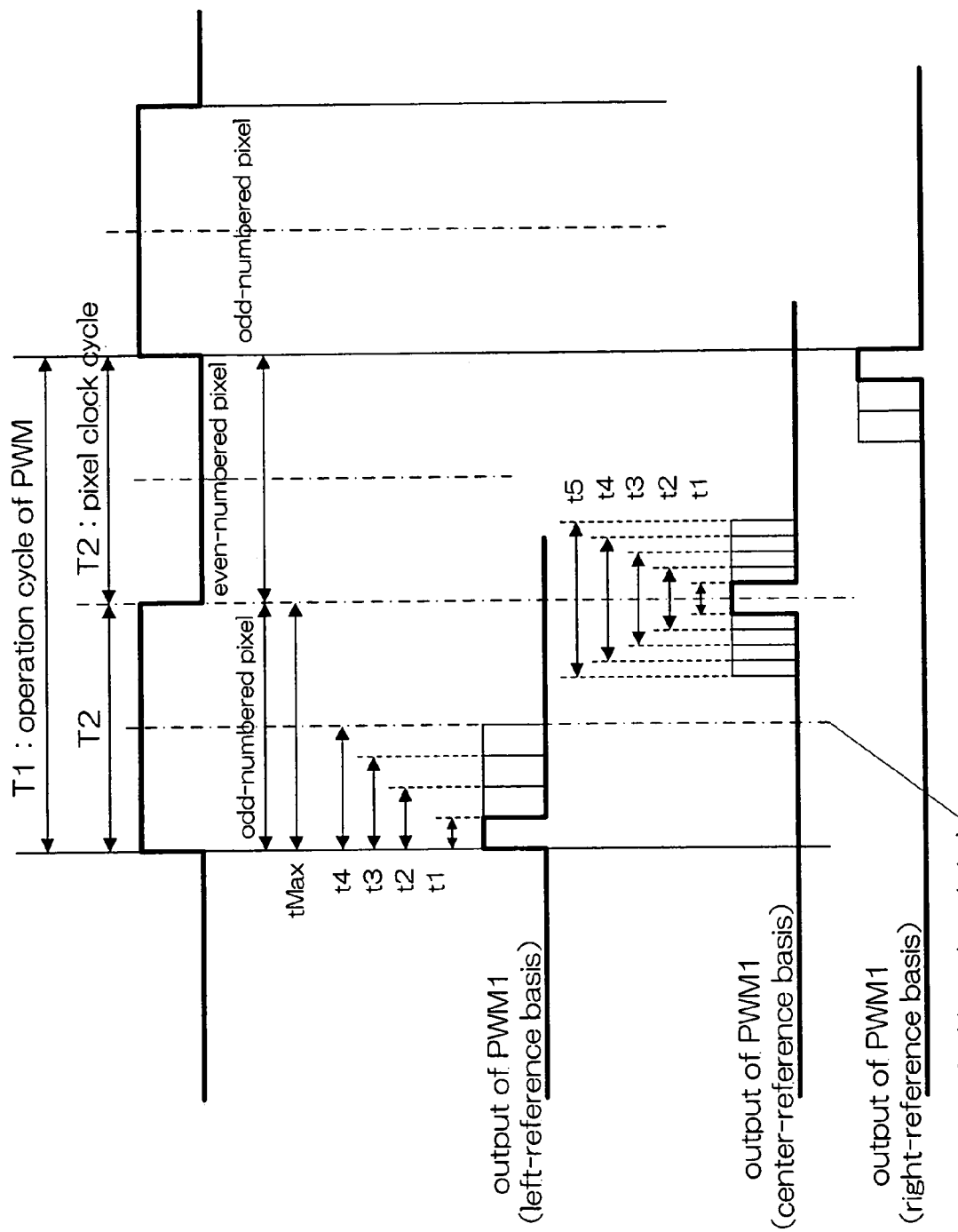
FIG. 3 is a diagram relating to pulse width adjustment and pulse positions of a pulse width modulator (PWM) in the first embodiment.
Figure 4:
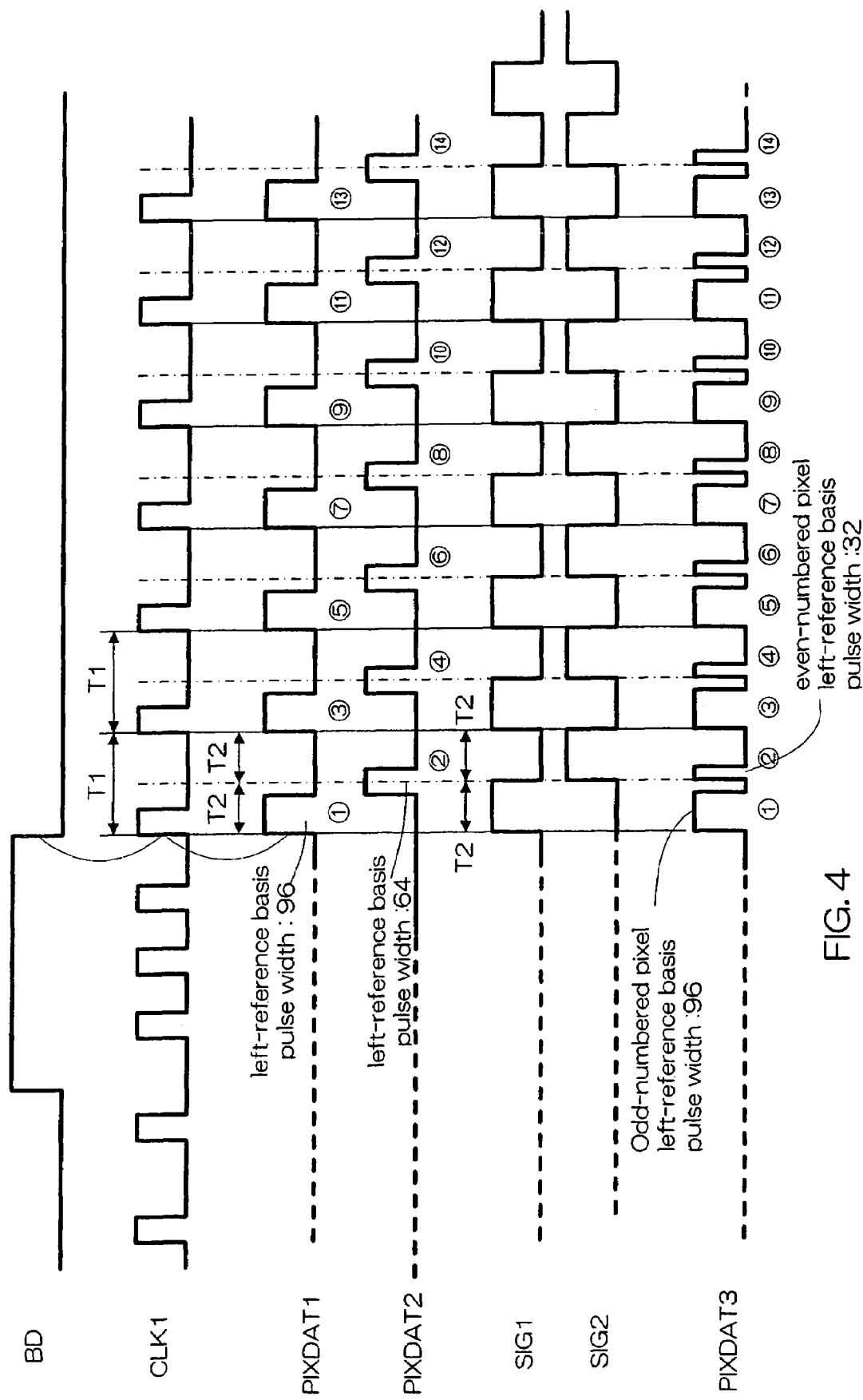
FIG. 4 is a timing chart of some major pulse signals as generated in the first embodiment.

FIG. 1 is an electrical block diagram of an image forming apparatus, FIG. 2 is a detailed circuit diagram of electrical circuitry of part of a beam light scanning device, FIG. 3 is a diagram for explanation of pulse width adjustment and pulse positions of a pulse width modulator (PWM), and FIG. 4 is a timing chart of the first embodiment.

An explanation will first be given of an overall configuration of the image forming apparatus shown in FIG. 1. The image forming apparatus includes a main control unit 11 that provides control over an entirety of the image forming apparatus. This control unit 11 may be a central processor unit or "CPU." This CPU 11 is operatively associated with a memory module 12 provided in the image forming apparatus. The memory module 12 is typically implemented as a read-only memory (ROM) that stores control tasks to be executed by the CPU 11 and a random access memory (RAM)—this is different from an image processing memory—for temporal storage of various kinds of data under the control of CPU 11.

The image forming apparatus also has a printer engine unit 13. This engine 13 includes an electrophotography process unit, a media-conveying unit, and an image fixing unit. Print media used herein may be sheets of paper, so the media conveyer is implementable as a paper feeder. The electrophotographic process unit is generally made up of an electrostatic charging unit that permits uniform electrification on the surface of an image carrying/retaining body, a development unit for making clearer or "emphasizing" a latent image that is created on the image retainer, and a transfer unit that transfers the emphasized image on the image retainer onto a sheet of paper being conveyed by the paper feeder. The image fixing unit is operable to photographically fix the image that was transferred to the paper. These electrophotographic processor, paper feeder and image fixer or the like may be known components and, for this reason, these are aggregated together as the printer engine unit 13 in FIG. 1, with detailed explanations and individual illustration thereof being eliminated herein.

The image forming apparatus further includes a scanner unit 14 for optically reading images of documents or else and an image processing unit 15 that contains an image memory for processing an image that was read by the scanner 14. Scanner 14 also is a known component and, thus, is briefly depicted in FIG. 1. An external interface (I/F) 16 is provided to receive data being sent from an externally associated personal computer (PC) or the like and then output to print media, e.g., paper sheets. Also provided is a page memory 17 that temporarily stores image information thus received from the external I/F 16. An image data I/F 18 is provided to selectively receive image data coming from either the image processor unit 15 or the page memory 17.

Further, the image forming apparatus has a control panel unit 19, which includes a control panel for permitting manual operations of operators and a control circuit operatively associated therewith. The apparatus is also capable of receiving data to be sent by means of facsimile communications via an external communication interface (Ext-Com I/F) 20.

The image forming apparatus further includes a laser control unit 30, which is a laser control means that is a characteristic part of the invention. The laser controller 30 is connected to a laser diode driver 82 that is operable to control a laser diode (LD) module 81 for the laser beam emission use. The laser controller 30 and LD 81 make up a light emission means. A laser beam as emitted from LD 81 is optically guided to hit the surface of the image retainer that is provided in the printer engine unit 13, thus forming thereon a latent image. The laser controller 30 is also connected to a beam detection circuit 84, which includes a driver that controls a horizontal synchronous sensor 83 for receipt of the laser beam emitted from LD 81, a current-to-voltage conversion circuit that converts a pulsate current as input from the horizontal sync sensor 83, and a binary circuit, also called binarizer. The sensor 83 and beam detector 84 make up a horizontal sync signal generation means. Additionally the laser controller 30 is also connected to the image data I/F 18, for receiving image data from image data I/F 18.

A polygon motor driver 86 is provided in the image forming apparatus, for control of a polygon motor 85 that rotates a polygon mirror, which receives and reflects a laser beam as emitted by the LD 81.

The CPU 11 is connected through data buses to the memory 12, printer engine 13, scanner 14, control panel unit 19, external communication I/F 20, beam detector circuit 84, polygon motor driver 86 and others.

A beam light scanning device is generally made up of the laser controller 30, LD 81, LD driver 82, horizontal sync sensor 83, beam detector circuit 84, polygon motor 85 and polygon motor driver 86.

A detailed explanation will next be given of the laser controller unit 30 with reference to FIG. 2. The laser controller 30 has several built-in components including an image data processing unit 31, a synchronizer circuit 32, a pulse generation circuit 33 and a reference clock generation circuit 34. The image data processor 31 serves as an image data processing means for receiving a train of image-processed data of neighboring picture elements or "pixels" and then dividing for distribution the data train into a first string of pixel data and a second string of pixel data. The synchronizer circuit 32 is a signal synchronization means for output of either the first pixel data or the second pixel data at a time in a way synchronous with a reference clock signal. The pulse generator circuit 33 acts as a mask pulse generation means for generating an electrical signal used to apply mask processing to certain data that can affect image data of neighboring pixels. The reference clock generator 34 generates at its output a clock signal for use as the reference as to the laser control processing.

The laser controller 30 also includes a pulse width modulator No. 1 (referred to hereinafter as first PWM) 35 for use as a first output pulse adjustment means for adjusting the width of an output pulse based on the first pixel data, and a pulse width modulator #2 (referred to as second PWM) 36 that is a second output pulse adjustment means for adjusting the output pulse width based on the second pixel data. Also provided are a first AND gate circuit (AND #1) 37, a second AND gate circuit (AND #2) 38 and a synthetic circuit 40. The first AND gate 37 is part of a data mask synthesis means for calculating a logical product of a signal being output from the pulse generator circuit 33 and a signal as output from the first PWM 35. The second AND gate 38 is part of the data mask synthesis means for receiving an output signal of the pulse generator circuit 33 which was inverted in polarity via an inverter 39—namely, polarity-inverted signal—and also an output signal of the second PWM 36 and for logically calculating a product of these signals. The synthetic circuit 40 is a synthesizer means for providing a logical sum of an output signal (first pixel data thus adjusted) from the first AND gate 37 and an output signal (second pixel data adjusted) of the second AND gate 38. Note that the synchronizer circuit 32, pulse generator circuit 33, first and second PWMs 35-36, first and second AND gates 37-38 and inverter 39 make up an adjustment means.

The beam detector circuit 84 and pulse generator circuit 33 are connected together so that a horizontal sync signal BD is sent forth to pulse generator 33. The beam detector 84 is also connected to the synchronizer circuit 32, causing the horizontal sync signal BD to be sent thereto. The image data processor 31 is connected to the image data I/F 18. Image data processor 31 is connected by separate signal lines for transferring the first pixel data and second pixel data toward synchronizer circuit 32. The reference clock generator 34 is connected to synchronizer 32. Synchronizer 32 is connected to the first PWM 35 and also coupled to second PWM 36. The first AND gate circuit 37 is connected to pulse generator 33 and also to first PWM 35. The second AND gate 38 is connected via the inverter 39 to pulse generator 33 and also to the second PWM 36. The synthetic circuit 40 is connected to first and second AND gates 37-38 and also to the LD driver 82.

The horizontal sync sensor 83 is configured from a photodiode (PD) assembly. While a laser beam is scanned in a direction indicated by arrow in FIG. 2 by a polygon mirror (not shown) that is spin-driven by the polygon motor 85, the sensor 83 detects or senses the pass-through timing of such laser beam and then produces a current with its magnitude corresponding to the amount of light thus sensed. This current is supplied to a current-to-voltage conversion circuit provided in the beam detector circuit 84. This I-V converter converts it into a corresponding voltage, which is then passed to binary circuitry for conversion to a digital signal that is output from the beam detector 84.

The image data processor 31 receives image data as input thereto via the image data I/F 18, which data may be pixel data being presently stored in the image memory in the image processor 15 or alternatively in the page memory 17 shown in FIG. 1. Image data processor 31 operates to divide, for alternate distribution, the input pixel data into strings of pixel data which correspond to respective PWMs 35-36. In this embodiment the first PWM 35 is arranged to process data of odd-numbered pixels, whereas the second PWM 36 processes data of even-numbered pixels. The resultant data items thus divided are then transferred via corresponding data lines to the synchronizer circuit 32. In this embodiment, the odd-numbered pixel data—i.e., first pixel data—is input to synchronizer circuit 32 by way of a line that indicates image data #1 in FIG. 2, while the even-numbered pixel data, i.e., second pixel data, is input thereto via another line indicating image data #2.

The synchronizer circuit 32 is operatively responsive to receipt of a reference clock signal CLK0 that is generated by the reference clock generator 34, for generating a new reference clock signal CLK1 that is in synchronism with the horizontal sync signal BD as output from the beam detector circuit 84. Upon receipt of the first pixel data sent from the image data processor 31, the synchronizer circuit 32 forces the data to be synchronized with the newly generated reference clock CLK1. Odd-numbered pixel data that is the first pixel data thus synchronized will be sent forth via a transfer line indicating image data #3 in FIG. 2 and then input to the first PWM 35. Similarly, even-numbered pixel data, i.e., the second pixel data thus synchronized by synchronizer 32, will be sent via a line indicating image data #4 in FIG. 2 and then input to the second PWM 36.

There are input to the pulse generator circuit 33 the horizontal sync signal BD as output from the beam detector circuit 84 and the reference clock signal CLK1 that is synchronized by the synchronizer circuit 32 using the horizontal sync signal BD as output from beam detector 84. Based on these input signals, pulse generator 33 generates a signal used to apply masking to certain data with affectability on neighboring pixels, which signal is output as a first mask pulse signal SIG1. This mask pulse signal SIG1 as output from pulse generator 33 is passed through the inverter 39, resulting in generation of a second mask pulse signal SIG2 with the opposite polarity.

The reference clock generator 34 is uniquely provided in the laser controller 30 in order to establish the timings for laser control.

The first PWM 35 and the second PWM 36 serving as the output pulse adjustment means are each arranged to perform outputting of pulse widths in accordance with the data of respective pixels. In the first embodiment these PWMs 35-36 are designed to commonly share the reference clock so that the first pixel data and second pixel data can overlap each other if nothing is done. To avoid this risk, the pulse adjusting and pulse position changing functions are used to provide a phase difference between output signals of the first and second PWMs 35-36. In addition, modifying the pulse width achieves formation of an image with less than one pixel. Furthermore, changing the pulse position realizes formation of smoothness-enhanced oblique lines without any appreciable stair step-like "jaggy" patterns. By use of this pulse position changeable function, this embodiment is capable of precluding unwanted overlapping of neighboring pixels. This can be said because it provides proper control in such a way that the pulse width is "sliced" into ¹⁄₂₅₅ segments while using the first PWM 35 to form odd-numbered pixels with the pulse position being defined with the left edge as a reference—in other words, pulse edges are left-aligned—and also using the second PWM 36 to form even-numbered pixels while defining the pulse position with a central portion as reference—namely, pulse edges are center-aligned.

Here, a detailed explanation will be given of the above-noted pulse width and position change/modify functions with reference to FIG. 3. Note that these functions are interpretable as the output pulse adjustment means.

A time period indicated by "T1" in FIG. 3 is comparable to the operation cycle of the first PWM 35. A period indicated by T2 in FIG. 3 corresponds to a pixel clock cycle. The period T1 is two times greater in length than the period T2. A first half portion—i.e., period T2—of the period T1 concerns an operation of an odd-numbered pixel, whereas the second half, T2, of the period T1 is related to an operation of an even-numbered pixel.

Defining the pulse position is selectable from three available schemes which follow: 1) the left-referencing scheme with a front-side pulse edge relative to a time sequence system being used as a reference or "base" point, 2) right-reference scheme with a rear-side pulse edge relative to the time axis being used as the base point, and 3) center-reference scheme with the center of a pulse width as the base point. In the case of the pulse position selected on the left-reference basis, the pulse width is changed or modified with the rising edge position of a pulse as the base point. More specifically, an increase in pulse width with respect to a minimal pulse width results in a likewise change in falling edge position on the right side shown in FIG. 3, which is on the rear side relative to the time axis concerned. This falling edge position change results in expansion of pulse width. In FIG. 3, the minimum pulse width is indicated by "t1." A pulse with its width two times longer than the pulse width t1 is indicated by "t2." A pulse with its width three times greater than the minimum pulse width t1 is indicated by "t3." A pulse with its width four times longer than minimum pulse width t1 is indicated by "t4." Note here that the pulse width t4 is almost equal to one-half of a maximal pulse width of an odd-numbered pixel. In case the pulse position is selected with the right edge as a reference, the pulse width is altered with the falling edge position of a pulse as the reference. More specifically, an increase in pulse width relative to the minimum pulse width results in a change or "offset" of the rising edge position on the left side shown in FIG. 3, which is on the front side with respect to the pulse sequence along the time axis. This leads to expansion of the pulse width. The falling edge position in the case of the right-reference scheme is identical to the rear edge portion of a specified pixel.

On the contrary, in case the pulse position is selected on the center-reference basis, the pulse width is changed with a central position of pulse width as a reference. More specifically, an increase in pulse width relative to the minimum pulse width results in changes in both the left-side rising edge position and right-side falling edge position on the front and rear sides with respect to the time series, which leads to pulse expansion. In FIG. 3, a pulse width for use as the minimum unit is indicated by t1. A pulse having its width that is two times greater than the pulse width t1 is indicated by t2. A pulse with its width being three times greater than the minimum pulse width is indicated by t3. A pulse with a width four times longer than the minimum pulse width is indicated by t4. A pulse with its width five times longer than the minimum width is denoted by t5.

In the first embodiment, pulse width adjusting elements having the above-noted functions are used for the first PWM 35 and second PWM 36. First PWM 35 is used with the left-reference scheme, while second PWM 36 is with the center-reference. Whereby, a phase is provided for each pixel signal.

The first AND gate circuit 37 receives at its inputs a signal of first pixel data PIXDAT1 and a mask signal. The data PIXDAT1 is output by the first PWM 35 and then subjected to pulse width adjustment processing. The mask signal is output from the pulse generator circuit 33. Upon receipt of these input signals, AND gate 37 generates at its output an adjusted signal, which is the signal indicated by "PIXDAT5"

in FIG. 2. Similarly the second AND gate circuit 38 inputs a signal of second pixel data PIXDAT2 that is output from the second PWM 36 and adjusted in pulse width and also an inverted version of the mask signal as output from pulse generator 33. Upon receipt of these signals, AND gate 38 outputs an adjusted signal as indicated by "PIXDAT6" in FIG. 2.

The synthetic circuit 40 is operable to combine or "synthesize" together the first and second pixel data, wherein the former is the adjusted data PIXDAT5 as output from the first AND gate 37 whereas the latter is the adjusted data PIXDAT6 being output from the second AND gate 38. The resulting combined signal is supplied, as pixel data PIXDAT3, to the LD driver 82. This synthetic circuit 40 is typically implemented as an OR gate circuit.

It should be noted that the LD driver 82 is the one capable of performing signal processing at high speeds when compared to the first and second PWMs 35-36. Thus, the LD driver 82 hardly fails to handle those signals that have been processed via two separate processing routes.

An operation of the first embodiment will next be explained with reference to FIG. 4 below.

When a horizontal sync signal BD is output from the beam detector circuit 84 and then input to the synchronizer circuit 32, the reference clock signal changes in cycle. In the first embodiment, upon rising up of the horizontal sync signal BD, a reference clock signal CLK1 being output from synchronizer 32 is changed to have a cycle which is shorter than the PWM operation period T1 stated previously.

When the horizontal sync signal BD potentially falls down, the reference clock signal CLK1 to be output from the synchronizer circuit 32 rises up, and the pixel data signal PIXDAT1 as output from the first PWM 35 also rises up in potential. At this time the first PWM 35 is performing output of a pulse width 96 with respect to 255 sliced pulse segments in period T1 on a left-reference basis. In addition, a first mask pulse signal SIG1 to be output from the pulse generator circuit 33 has its pulse width equivalent in time length to one-half (T2) of the PWM operation period T1. Regarding an output signal PIXDAT3 of the synthetic circuit 40 also, this signal rises up when the horizontal sync signal BD falls down, causing the outputting of first pixel data to get started. The pulse width at this time is such that the first mask pulse signal SIG1 has also risen up through the entire rise-up time of PIXDAT1. Thus it is possible to obtain a signal similar or equivalent to PIXDAT1. Additionally the signal of PIXDAT3 at this time is a signal of PIXDAT5, although not specifically depicted in FIG. 4.

An output signal of the second PWM 36 which forms a second pixel image has its pulse width 64 that is defined on a center-reference basis. Accordingly, the potential rise-up of a signal of PIXDAT2 takes place prior to the elapse of T2 since the fall-down of the horizontal sync signal BD. A second mask pulse signal SIG2 that is produced based on the first mask pulse signal SIG1 generated from the pulse generator circuit 33 behaves to rise up after elapse of T2 since the fall-down of horizontal sync signal BD. Note here that as shown in FIG. 4, the first and second mask pulse signals SIG1 and SIG2 have a cycle of T1 and are T2 in "H" level time and in "L" level time; thus, these act as signals with a duty ratio of 50%. These mask pulse signals SIG1-SIG2 exhibit a phase difference of T2 therebetween. The signal PIXDAT3 that was output from the synthetic circuit 40 has its pulse width 32 of a specified width value determined based on the output signal PIXDAT2. At this time, an H-level output time of PIXDAT3 is a time period in which both the data PIXDAT2 and the second mask pulse signal SIG2 stay at H level. As mask pulse signal SIG2 becomes H level after elapse of T2 since the riseup of horizontal sync signal BD, a portion corresponding to the pulse width 32 that is the first half of the H-level time of PIXDAT2 does not reflect on PIXDAT3: output of PIXDAT3 of this portion is at L level. The first half of the output pulse width of PIXDAT2 that is an output of the second PWM 36 does not reflect on the LD driver 82—in other words, it is masked. Fortunately, this portion is inherently the one that is not processed by the second PWM 36 but is at the timing to be handled by the first PWM 35. In this way, even where the second PWM 36 is of the center-reference scheme, masking is accomplished based on an output signal of the pulse generator circuit 33. This makes it possible to provide a signal with a desired pulse width. Additionally, although not specifically depicted herein, the signal of PIXDAT3 obtained at this time is a signal of PIXDAT6.

With the above-noted technique, an output with the pulse width 96 is obtainable with respect to the first pixel, and an output with the pulse width 32 is obtainable for the second pixel. In regard to the third pixel and its following odd-numbered pixels, the output of PIXDAT3 will be obtained by a similar operation to that of the first pixel. Regarding the fourth pixel and its following even-numbered pixels, the output of PIXDAT3 will be obtained in a similar way to the second pixel.

In the first embodiment, it is possible to attain high-speed light emission. This can be said because two parallel-connected PWMs 35-36 are used with respect to the single LD driver 82 for achievement of the light emission, wherein the former is slower in drive operation than the latter. With such an arrangement, it also becomes possible to perform light emission at high speeds, when compared to arrangements for performing light emission by using a single PWM per LD driver. Another advantage lies in an ability to achieve high-speed performance without having to increase the required number of high-priced laser diodes. In addition, using the pulse generator circuit 33 makes it possible to apply masking to the data (signal) that can affect certain portions of neighboring pixels. Thus it is possible to establish appropriate light emission timings, which in turn makes it possible to achieve successful image formation.

Figure 5:
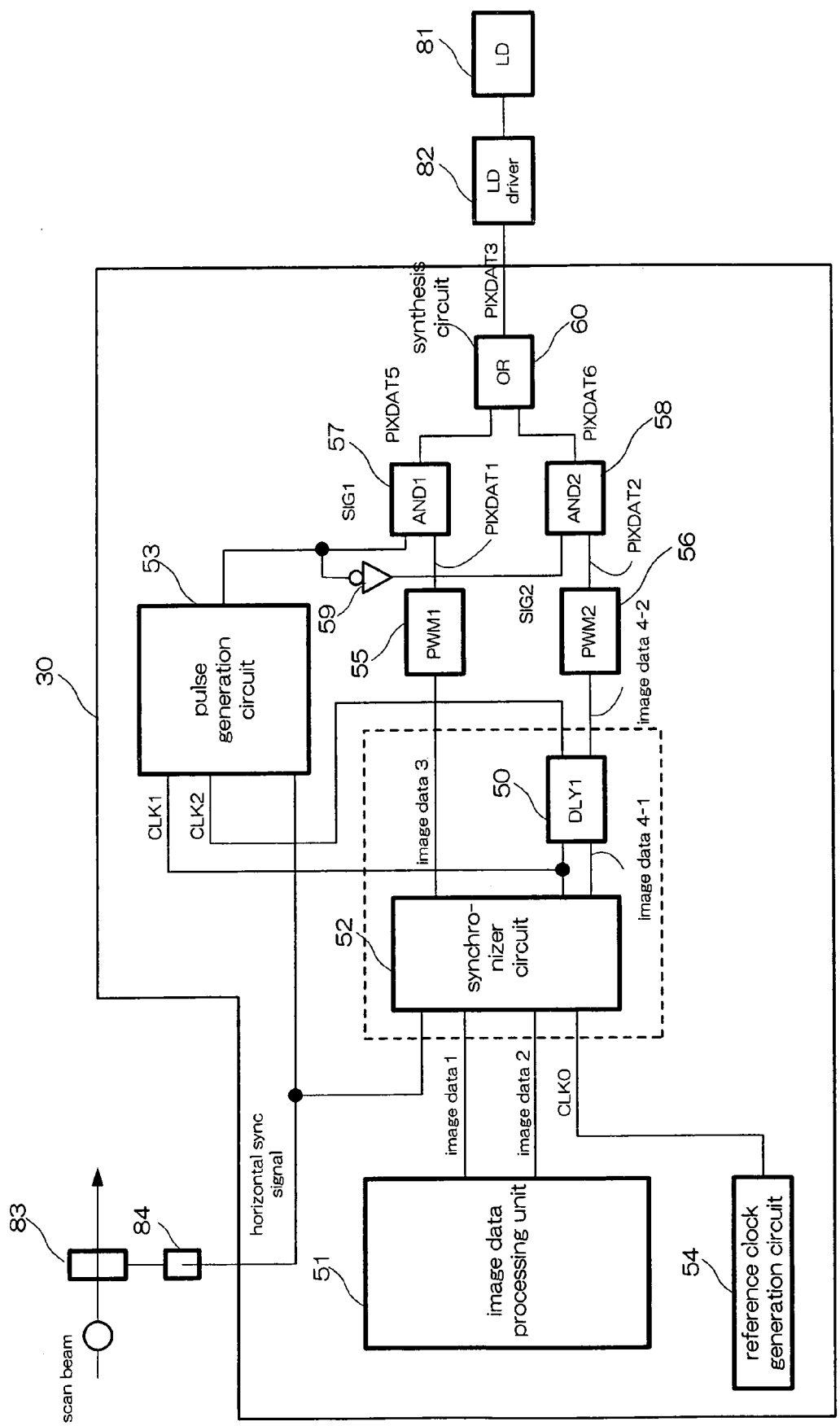
FIG. 5 shows a detailed configuration of electrical circuitry of part of a beam light scanner device in accordance with a second embodiment of the invention.
Figure 6:
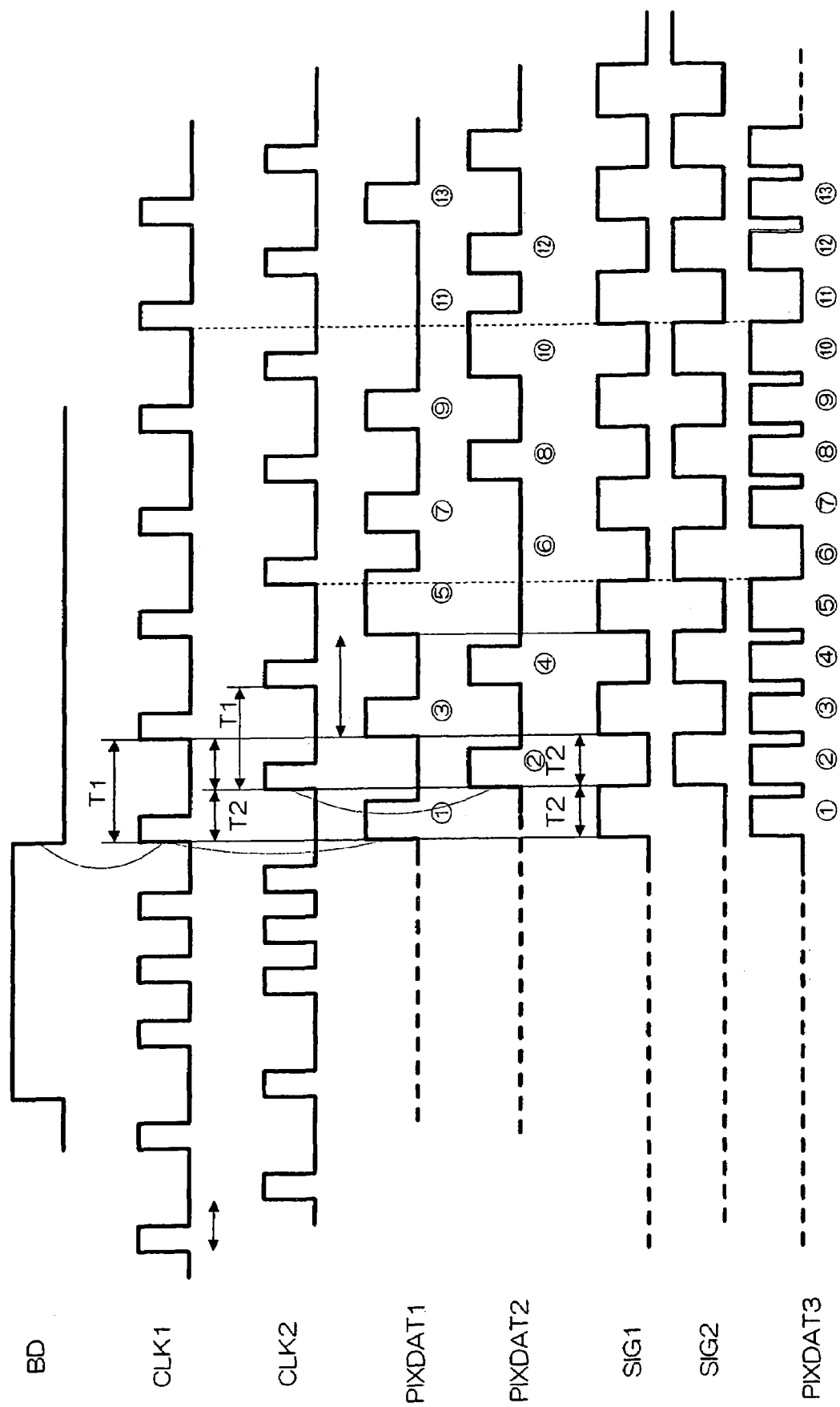
FIG. 6 is a timing diagram of some major pulse signals generated in this second embodiment.

An explanation will next be given of a second embodiment of the invention. Note that the entirety of image forming apparatus is similar to that shown in FIG. 1 so that like parts or components are denoted by like reference characters, with their detailed explanations eliminated herein. FIG. 5 depicts a detailed configuration of electrical circuitry of a laser control unit 30, which is part of a beam light scanner device. FIG. 6 is a timing chart of the second embodiment.

Internal circuitry of the laser control unit 30 of FIG. 5 is made up of several components, which include an image data processing unit 51, a synchronizer circuit 52, a pulse generator circuit 53 and a reference clock generator circuit 54. The image data processor 51 is an image data processing means for dividing, for alternate distribution, image-processed neighboring pixel data into first pixel data and second pixel data. The synchronizer circuit 52 is a signal synchronization means for outputting the first and second pixel data in a way synchronized with a reference clock signal. The pulse generator circuit 53 is a mask pulse generation means for generating more than one electrical signal used to apply masking to certain data that can affect neighboring pixels. The reference clock generator 54 is operable to generate at its output a clock signal for use as the reference concerning the laser control processing.

The laser controller 30 also includes a delay circuit (DLY1) 50 and first and second PWMs 55-56. The delay circuit 50 is a delay means for forcing the clock-synchronized pixel data as output from the synchronizer circuit 52 to delay by a prespecified length of time. The first PWM 55 is a first output pulse adjustment means for adjusting the pulse width of an output signal based on a first pixel. The second PWM 56 is a second output pulse adjustment means for adjusting the output pulse width based on the second pixel data. The laser controller 30 further includes first and second AND gate circuits 57-58 and a synthetic circuit 60. The first AND gate (AND #1) 57 is part of a data mask synthesis means for calculating a logical product—i.e., AND'ed value—of an output signal of pulse generator circuit 53 and an output signal of first PWM 55. The second AND gate (AND #2) 58 serves as the data mask synthesis means for calculating an AND'ed value of an inverted version of the output signal of pulse generator 53 via an inverter 59 and an output signal of the second PWM 56. The synthetic circuit 60 calculates a logical sum, i.e., an OR'ed value, of output signals (i.e., first and second pixel data adjusted) of the first and second AND gates 57-58. Note that an adjustment means is generally made up of the synchronizer circuit 52, pulse generator circuit 53, PWMs 55-56, AND gates 57-58, inverter 59 and delay circuit 50.

The pulse generator circuit 53 is connected to a beam detector circuit 84, which supplies thereto a horizontal sync signal BD. The beam detector 84 is also coupled to the synchronizer circuit 52, for permitting transmission of the sync signal BD. The image data processor 51 is connected to an image data I/F 18. Image data processor 51 is connected to synchronizer 52 by way of separate signal lines, for sending thereto the first pixel data and second pixel data respectively. The reference clock generator 54 is connected to synchronizer 52, which in turn is coupled to first PWM 55. Synchronizer 52 is connected to the delay circuit 50 via two signal lines for respective transmission of a timing signal and an image signal. Delay circuit 50 is connected to pulse generator 53 and also connected to second PWM 56. First PWM 57 is connected to pulse generator 53 and also to first PWM 55. Second AND gate 58 is connected via inverter 59 to pulse generator 53 and also coupled to second PWM 56. The synthetic circuit 60 is connected to first and second AND gates 57-58 and also to a laser diode (LD) driver 82.

The image data processor 51 receives image data as input thereto via the image data I/F 18, which data may be pixel data being stored in the image memory in the image processor 15 or alternatively in the page memory 17. Image data processor 51 divides, for alternate distribution, the input pixel data into strings of pixel data which correspond to respective PWMs 55-56. In this embodiment the first PWM 55 is designed to process data of odd-numbered pixels, while the second PWM 56 processes data of even-numbered pixels. The data items thus divided for distribution are then sent via corresponding transfer lines to the synchronizer circuit 52. In this embodiment, the odd pixel data—i.e., first pixel data—is input to synchronizer circuit 52 by way of a line that indicates image data #1 in FIG. 5, while the even pixel data, i.e., second pixel data, is input thereto via another line indicating image data #2.

The synchronizer circuit 52 is responsive to receipt of a reference clock signal CLK0 that is generated by the reference clock generator 54, for generating a new reference clock signal CLK1 that is synchronized with the horizontal sync signal BD as output from the beam detector circuit 84. Upon receipt of the first pixel data being sent from the image data processor 51, the synchronizer circuit 52 synchronizes the data with the newly generated reference clock CLK1. Odd-numbered pixel data that is the first pixel data thus synchronized will be sent forth via a transfer line indicating image data #3 in FIG. 5 and then input to the first PWM 55. Similarly, even-numbered pixel data, i.e., the second pixel data thus synchronized by synchronizer 52, will be sent via a line indicating image data #4-1 in FIG. 5 and then input to the delay circuit 50.

Upon receipt of the second pixel data from the synchronizer circuit 52, the delay circuit 50 functions to cause outputting of the data to delay by a specified time within a time period equivalent to a single pixel output session. In the second embodiment, the delay circuit 50 delays it by a degree corresponding to one pixel, thereby providing a time-delayed output signal, which is then passed to the second PWM 56 via a line that indicates image data 4-2 in FIG. 5. Additionally a one-pixel delayed sync signal is input as a reference clock CLK2 to the pulse generator circuit 53.

There are input to the pulse generator circuit 53 the horizontal sync signal BD as output from the beam detector circuit 84 and the reference clock signal CLK1 that is synchronized by the synchronizer circuit 52 using the horizontal sync signal BD as output from beam detector 84. In addition, a reference clock signal CLK2 that was delayed by a specified time is also input from the delay circuit 50. Based on these input signals, pulse generator 53 generates a signal used to mask certain data that can affect neighboring pixels, which signal is output as a first mask pulse signal SIG1. This mask pulse signal SIG1 as output from pulse generator 53 is passed through the inverter 59, resulting in generation of a second mask pulse signal SIG2 with the opposite polarity.

The reference clock generator 54 is uniquely provided in the laser controller 30 in order to establish appropriate timings of laser control.

The first and second PWMs 55-56 serving as the output pulse adjustment means are each designed to perform outputting of pulse widths and setup of pulse positions in accordance with the data of respective pixels. By use of this pulse position changeable functionality, the second embodiment is arranged so that the pulse width is sliced into segments each having an equal width of $\frac{1}{255}$ for providing control while using the first PWM 55 to form odd-numbered pixel data with pulse positions defined on a left-referencing basis and also using the second PWM 56 to form even-numbered pixel data with pulse positions defined on the left-reference basis in a similar way to the first PWM 55. Using this technique permits provision of appreciable phase separation between respective pixel data signals, thereby preventing unwanted overlap between neighboring pixels. The second embodiment is similar to the first embodiment in PWM's pulse width/position changing functions.

The first AND gate circuit 57 receives at its inputs a signal of first pixel data PIXDAT1 and a mask signal. The data PIXDAT1 is output by the first PWM 55 and then adjusted in pulse width. The mask signal is output from the pulse generator circuit 53. Upon receipt of these input signals, AND gate 57 generates at its output an adjusted signal, which is the signal indicated by "PIXDAT5" in FIG. 5. Similarly the second AND gate circuit 58 inputs a signal of second pixel data PIXDAT2 that is output from the second PWM 56 and pulse width-adjusted and also an inverted version of the mask signal as output from the pulse generator circuit 53. Upon receipt of these signals, AND gate 58 outputs an adjusted signal as indicated by "PIXDAT6" in FIG. 5.

The synthetic circuit 60 is operable to add and combine together the first and second pixel data, wherein the former is the adjusted data PIXDAT5 as output from the first AND gate 57 whereas the latter is the adjusted data PIXDAT6 as output from the second AND gate 58. The combined signal is then supplied, as pixel data PIXDAT3, to the LD driver 82. The synthetic circuit 60 is implemented as an OR gate circuit.

An operation of the second embodiment will next be described with reference to FIG. 6.

When a horizontal sync signal BD is output from the beam detector circuit 84 and then input to the synchronizer circuit 52, the reference clock signal changes in cycle. In the second embodiment, upon rising up of the horizontal sync signal BD, a reference clock signal CLK1 to be output from synchronizer 52 is changed to have a cycle which is shorter than the PWM period T1 stated supra.

When the horizontal sync signal BD potentially falls down, the reference clock signal CLK1 being output from the synchronizer circuit 52 rises up, and also the pixel data signal PIXDAT1 as output from the first PWM 55 rises up in potential. At this time the first PWM 55 is performing output of a pulse width 96 with respect to 255 sliced pulse segments in period T1 on a left-reference basis. In addition, a first mask pulse signal SIG1 to be output from the pulse generator circuit 53 has its pulse width equivalent in time length to the half (T2) of one period T1 between adjacent rising pulse edges. Regarding an output signal PIXDAT3 of the synthetic circuit 60 also, this signal rises up when the horizontal sync signal BD falls down, causing the outputting of first pixel data to get started. The pulse width at this time is such that the first mask pulse signal SIG1 has also risen up through the entire rise-up time of PIXDAT1. Thus it is possible to obtain a signal that is equivalent to PIXDAT1. Additionally a signal of PIXDAT3 at this time is a signal of PIXDAT5, although not specifically depicted in FIG. 6.

The reference clock CLK2 rises up at an end point of period T2 after elapse of a time corresponding to one pixel since the fall-down of the horizontal sync signal BD. At this time a signal PIXDAT2 that is output from the second PWM 56 rises up. In this event the second PWM 56 performs outputting of a pulse width 96 during 255 sliced pulse segments in period T1 on the left-reference basis. A second mask pulse signal SIG2 is generated based on the first mask pulse signal SIG1 that was generated from the pulse generator circuit 53. The signal SIG2 rises up after elapse of T2 since the fall-down of horizontal sync signal BD.

The first mask pulse signal SIG1 as output from the pulse generator circuit 53 has its pulse width of time length T2, which is half of one period T1 between the rising edges of adjacent clock pulses during PWM operation. An output signal PIXDAT3 of synthetic circuit 60 also rises up when the horizontal sync signal BD falls down, causing the outputting of the first pixel data to get started. The pulse width at this time is such that the first mask pulse signal SIG1 also has risen up through an entire riseup time period of PIXDAT1. Thus it is possible to obtain an equivalent signal to PIXDAT1. Additionally a signal of PIXDAT3 at this time is a signal of PIXDAT5, although not specifically shown in FIG. 6.

The time period T2 is substantially equal in length to the cycle of a one-pixel data processing operation. As shown in FIG. 6, the first and second mask pulse signals SIG1 and SIG2 are such that each has its cycle of T1 and is T2 in both H-level time period and T2 in L-level time, thereby acting as a signal with its duty ratio of 50%. These mask pulse signals SIG1-SIG2 exhibit a phase difference of T2 therebetween. The signal PIXDAT3 that was output from the synthetic circuit 60 has its pulse width 96 of a specified width value as determined based on the output signal PIXDAT2. Although not specifically depicted, the signal of PIXDAT3 at this time is a signal of PIXDAT6.

With the above-noted technique, an output with the pulse width 96 is obtainable with respect to the first pixel, and an output with the pulse width 96 is also obtained for the second pixel. In regard to a third pixel and its following odd-numbered pixels, the output of PIXDAT3 will be obtained by a similar operation to that of the first pixel. Regarding a fourth pixel and its following even-numbered pixels, the output of PIXDAT3 will be obtained in a similar way to the second pixel.

However, the output pulses of the first and second PWMs 55-56 can sometimes vary in width due to environmental changes, such as temperature changes or else, to have larger pulse widths than expected. One typical case of it is shown in FIG. 6 under an assumption that such pulse width variation occurs when processing the data of fifth and tenth pixels.

As for the fifth pixel data, unwanted pulse width increment takes place, whereby its corresponding H-level output pulse width of PIXDAT1 becomes longer than the time length of one-pixel period T2, as indicated by dotted line in FIG. 6. Merely outputting of this signal can affect the data of neighboring pixels, resulting in lack of an ability to executing advanced image processing. On the other hand, the first mask pulse signal SIG1 relating to the fifth pixel data has its H-level pulse width equal to the time length of one-pixel period T2. The output signal PIXDAT3 of synthetic circuit 60 has an OR'ed value of PIXDAT1 and first mask pulse signal SIG1. Accordingly, even if the signal PIXDAT1 is the one that can affect the neighboring pixels, masking is applied by the first mask pulse signal SIG1. This makes it possible to prevent the signal PIXDAT3 from affecting the neighboring pixels.

The same goes with the case of the tenth pixel. That is, masking is applied by the second mask pulse signal. SIG2 even if the signal PIXDAT2 is the one that affects the neighboring pixels. Thus it is possible to prevent the signal PIXDAT3 from affecting the neighboring pixels.

In the second embodiment, it is possible to achieve high-speed light emission. This can be said because two separate PWMs 55-56 are used with respect to the single LD driver 82 for accomplishment of the light emission required, wherein the PWMs are slower in drive operation than the LD driver. With this arrangement, it is also possible to perform light emission at higher speeds than arrangements for performing light emission by using one PWM per LD driver. Another advantage is an ability to achieve high-speed performance without having to increase the required number of high-priced laser diodes. In addition, using the pulse generator circuit 53 makes it possible to apply masking to the data (signal) that can affect certain portions of neighboring pixels. Thus it becomes possible to establish appropriate light emission timings, which in turn makes it possible to achieve successful image formation.

A further advantage lies in the capability to prevent the signal as output from the pulse generator circuit 53 from affecting neighboring pixels even where the PWM's output data stays at H level for a long time due to possible environmental changes, such as temperature changes.

Figure 7:
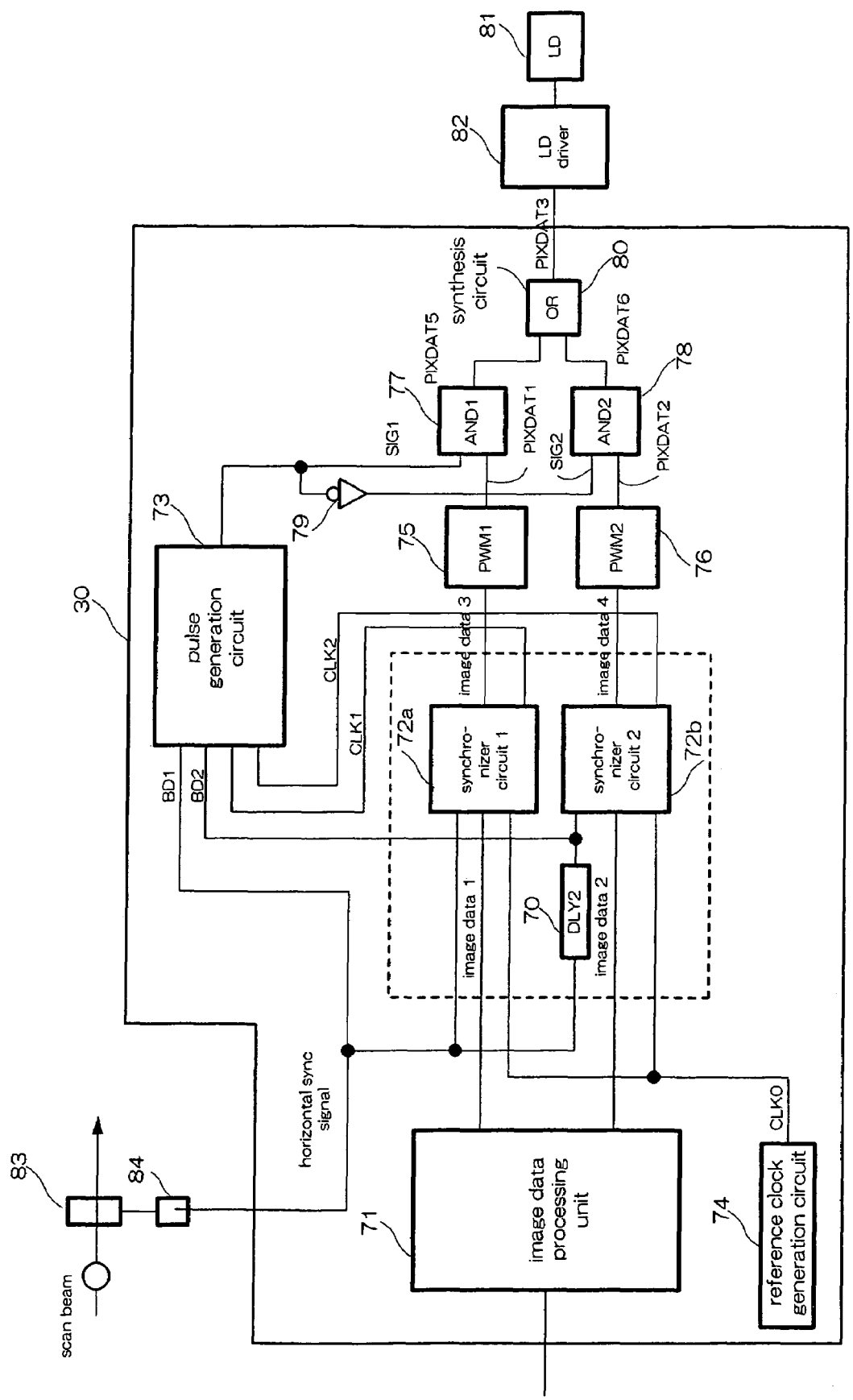
FIG. 7 illustrates a detailed configuration of electrical circuitry of part of a beam light scanner device in accordance with a third embodiment of the invention.
Figure 8:
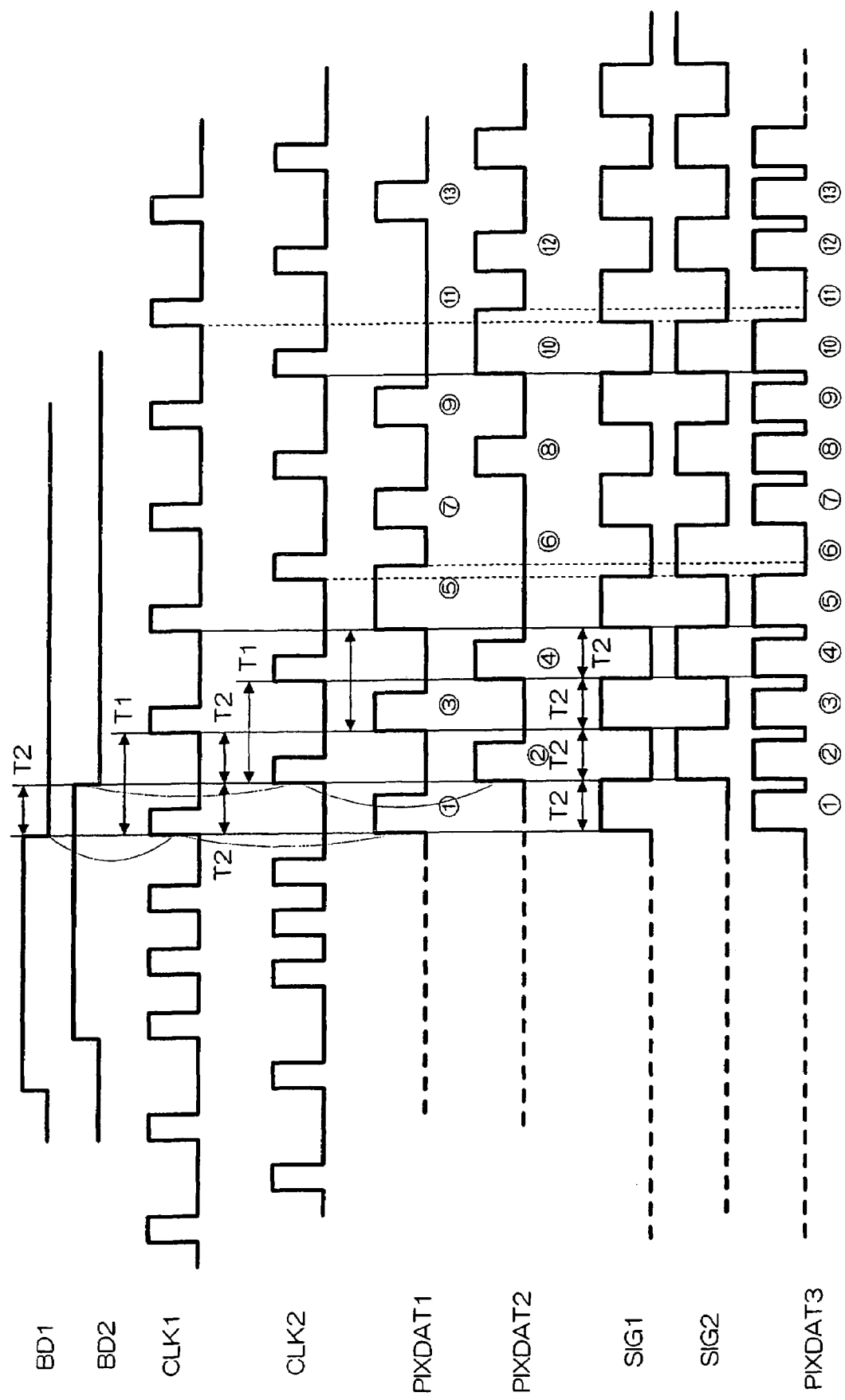
FIG. 8 is a timing chart of major pulse signals generated in the third embodiment.

An explanation will next be given of a third embodiment of the invention. Note that an entirety of image forming apparatus is similar to that shown in FIG. 1 so that like parts or components are indicated by like reference characters, with detailed explanations eliminated herein. FIG. 7 depicts a detailed configuration of electrical circuitry of a laser control unit 30, which is part of a beam light scanner device. FIG. 8 is a timing chart of the third embodiment.

Internal circuitry of the laser control unit 30 of FIG. 7 is made up of several components, including an image data processing unit 71, a couple of first and second synchronizer circuits 72a-72b, a pulse generator circuit 73 and a reference clock generator circuit 74. The image data processor 71 is an image data processing means for dividing, for alternate distribution, image-processed neighboring pixel data into first pixel data and second pixel data. The first synchronizer circuit (synchronizer #1) 72a is a first signal synchronization means for outputting the first pixel data in a way synchronized with a reference clock signal. The second synchronizer circuit (synchronizer #2) 72b is a second signal synchronization means for outputting the second pixel data in a way synchronous with the reference clock signal. The pulse generator circuit 73 is a data mask synthesis means for generating more than one electrical signal used to apply masking to certain data that can affect neighboring pixels. The reference clock generator 74 generates at its output a clock signal for use as the reference concerning the laser control processing.

The laser controller 30 also includes a delay circuit (DLY1) 70 and first and second PWMs 75-76. The delay circuit 70 is a delay means for forcing a horizontal sync signal BD1 being output from a horizontal synchronous sensor 83 of FIG. 7 to delay by a prespecified length of time. The first PWM 75 is a first output pulse adjustment means for adjusting the pulse width of an output signal based on a first pixel. The second PWM 76 is a second output pulse adjustment means for adjusting the output pulse width based on the second pixel data. The laser controller 30 further includes first and second AND gate circuits 77-78 and a synthetic circuit 80. The first AND gate (AND#1) 77 is part of the data mask synthesis means for calculating a logical AND'ed value of an output signal of pulse generator circuit 73 and an output signal of first PWM 75. The second AND gate (AND#2) 78 serves as another part of the data mask synthesis means for calculating an AND'ed value of a polarity-inverted version of the output signal of pulse generator 73 via an inverter 79 and an output signal of the second PWM 76. The synthetic circuit 80 calculates a logical sum, i.e. an OR'ed value, of output signals (first and second pixel data thus adjusted) of the first and second AND gates 77-78. Note that an adjustment means is generally made up of the synchronizer 72, pulse generator 73, PWMs 75-76, AND gates 77-78, inverter 79 and delay circuit 70.

A beam detector circuit 84 is connected to the pulse generator circuit 73 and also coupled to the delay circuit 70. Beam detector 84 is also connected to the first synchronizer circuit 72a, for sending thereto a horizontal sync signal BD1. The image data processor 71 is connected to image data I/F 18. Data processor 71 is connected to first synchronizer 72a for sending thereto first pixel data. Processor 71 is connected to second synchronizer 72b for transferring thereto second pixel data. The reference clock generator 74 is connected to first and second synchronizers 72a-72b. First synchronizer 72a is connected to first PWM 75 and also to pulse generator 73. Second synchronizer 72b is connected to second PWM 76 and pulse generator 73. Synthetic circuit 80 is coupled to LD driver 82 as shown in FIG. 7.

The first AND gate 77 is connected to the pulse generator circuit 73 and also to the first PWM 75. The second AND gate 78 is connected via inverter 79 to pulse generator 73 and also coupled to the second PWM 76. Synthetic circuit 80 is connected to first and second AND gates 77-78. The image data processor 71 is such that image data is input thereto by way of the image data I/F 18, wherein the input data may be pixel data being stored in an image memory in image processor 15 or in page memory 17. Image data processor 71 subdivides for distribution a train of input pixel data into strings of pixel data corresponding to respective PWMs. In this embodiment, settings are made so that odd-numbered pixel data is processed by the first PWM 75, while even-numbered pixel data is by the second PWM 76. The distributed pixel data is then transferred via a corresponding signal line to either the first synchronizer circuit 72a or second synchronizer circuit 72b. In this embodiment, the odd-numbered pixel data, i.e. first pixel data, is input via a line indicating image data #1 in FIG. 7 to first synchronizer circuit 72a, whereas the even-numbered pixel data is input via a line indicating image data #2 to second synchronizer circuit 72b.

The delay circuit 70 functions to force the horizontal sync signal BD1 received from the beam detector circuit 84 to delay by a degree corresponding to one pixel. An output signal of this delay circuit 70 that was delayed by a specified time is sent forth via a line indicating a horizontal sync signal BD2 in FIG. 7 toward the pulse generator circuit 73, as a one pixel-delayed horizontal sync signal BD2.

The first synchronizer circuit 72a is operatively responsive to receipt of a reference clock signal CLK0 as generated by the reference clock generator 74, for generating a new reference clock signal CLK1 that is synchronized with the horizontal sync signal BD1 that has been output from the beam detector circuit 84. The first synchronizer 72a causes the first pixel data being sent from the image data processor 71 to be in synchronism with the newly generated reference clock signal CLK1. Odd-numbered pixel data, i.e., the first pixel data thus synchronized, is input to the first PWM 75 via a signal line indicating image data #3 in FIG. 7.

The second synchronizer circuit 72b is responsive to receipt of the reference clock signal CLK0 as generated by the reference clock generator 74, for generating a new reference clock signal CLK2 that is synchronized with the horizontal sync signal BD2 that was output from the beam detector circuit 84 and then delayed. Second synchronizer 72b causes the first pixel data being sent from image data processor 71 to be in synchronism with the newly generated reference clock signal CLK2. Odd-numbered pixel data, i.e., the synchronized second pixel data, is input to the second PWM 76 via a signal line indicating image data #4 in FIG. 7.

The pulse generator circuit 73 receives at its inputs the horizontal sync signal BD1 as output from the beam detector circuit 84 and the one pixel-delayed horizontal sync signal BD2 coming from the delay circuit 70. Pulse generator 73 also inputs the reference clock signals CLK1 and CLK2 as output from the first and second synchronizer circuits 72a-72b respectively. Pulse generator 73 generates, based on the input signals, a signal for masking the data that can affect neighboring pixels, which signal will be output as a first mask pulse signal SIG1. This mask pulse signal SIG1 thus output from pulse generator 73 is passed through the inverter 79, resulting in creation of a second mask pulse signal SIG2 with the opposite polarity.

The reference clock generator 74 is uniquely provided in the laser controller 30, for establishing appropriate timings of laser control.

The first and second PWMs 75-76 serving as the output pulse adjustment means are each designed to perform outputting of pulse widths and setup of pulse positions in accordance with the data of respective pixels. By use of this pulse position changeable function, the third embodiment is arranged so that a pulse width is sliced into segments each having an equal width of ⅟₂₅₅ for providing control while using the first PWM 75 to form odd-numbered pixel data with pulse positions defined on a left-referencing basis and also using the second PWM 76 to form even-numbered pixel data with pulse positions defined on the left-reference basis in a similar way to first PWM 75. Using this technique permits provision of appreciable phase separation or "isolation" between respective pixel data signals, thereby preventing unwanted overlap between neighboring pixels. This embodiment is similar to the first embodiment in PWM's pulse width/position modifying functions.

The first AND gate circuit 77 receives at its inputs a signal of first pixel data PIXDAT1 and a mask signal. The data PIXDAT1 is output by the first PWM 75 and then adjusted in pulse width. The mask signal is output from the pulse generator circuit 73. Upon receipt of these input signals, AND gate 77 generates at its output an adjusted signal, which is the signal indicated by "PIXDAT5" in FIG. 7. Similarly the second AND gate circuit 78 inputs a signal of second pixel data PIXDAT2 that is output from the second PWM 76 and pulse width-adjusted and also an inverted version of the mask signal as output from the pulse generator circuit 73. Upon receipt of these signals, AND gate 78 outputs an adjusted signal indicated by "PIXDAT6" in FIG. 7.

The synthetic circuit 80 is operable to add and combine together the first and second pixel data, wherein the former is the adjusted data PIXDAT5 as output from the first AND gate 77 whereas the latter is the adjusted data PIXDAT6 as output from the second AND gate 78. The resultant signal is then supplied, as pixel data PIXDAT3, to the LD driver 82. The synthetic circuit 80 may be an OR gate circuit.

An operation of the third embodiment will next be discussed with reference to FIG. 8 below.

When a horizontal sync signal BD1 is output from the beam detector circuit 84 and then input to the synchronizer circuit 72a, the reference clock signal varies in cycle. In the third embodiment, upon rising up of the horizontal sync signal BD1, a reference clock signal CLK1 to be output from synchronizer 72a is changed to have a cycle which is shorter than the PWM period T1 stated previously. In addition, when a horizontal sync signal BD2 that was delayed by the delay circuit 70 is input to the second synchronizer circuit 72b, the reference clock signal changes in cycle. In the third embodiment, upon rising up of the sync signal BD2, the reference clock CLK1 to be output from second synchronizer 72b is modified to have a cycle which is shorter than the PWM period T1.

When the horizontal sync signal BD1 potentially falls down, the reference clock signal CLK1 being output from the first synchronizer circuit 72a rises up, and also the pixel data signal PIXDAT1 as output from the first PWM 75 rises up in potential. At this time the first PWM 75 is performing output of a pulse width 96 with respect to 255 sliced pulse segments in period T1 on a left-reference basis. In addition, a first mask pulse signal SIG1 to be output from the pulse generator circuit 73 has its pulse width equal in time length to the half (T2) of one period T1 between adjacent rising pulse edges. An output signal PIXDAT3 of the synthetic circuit 80 also rises up when the horizontal sync signal BD1 or BD2 falls down, causing the outputting of first pixel data to get started. The pulse width at this time is such that the first mask pulse signal SIG1 has also risen up through the entire rise-up time of PIXDAT1. Thus it is possible to obtain a signal that is equivalent to PIXDAT1. Additionally the signal of PIXDAT3 at this time is a signal of PIXDAT5, although not specifically depicted herein.

When the horizontal sync signal BD2 that was delayed by the delay circuit 70 falls down in potential, the reference clock signal CLK2 as output from the second synchronizer circuit 72b rises up, and the pixel data PIXDAT2 being output from the second PWM 76 also rises up. After the elapse of T2 time since the riseup of horizontal sync signal BD1, the horizontal sync signal BD2 rises up. The second PWM 76 is performing output of the pulse width 96 with respect to 255 sliced pulse segments in period T1 on a left-reference basis. On the other hand, the second mask pulse signal SIG2 as output from the pulse generator circuit 73 has its pulse width equal to the T2 period that is half of the PWM operation period T1. An output signal PIXDAT3 of the synthetic circuit 80 also rises up when the horizontal sync signal BD2 falls down, causing the outputting of a second pixel to get started. At this time, the pulse width is such that the second mask pulse signal SIG2 has also risen up through the entire rise-up time of PIXDAT2 so that it is possible to obtain an equivalent signal to PIXDAT1. Additionally the signal of PIXDAT3 at this time is a signal of PIXDAT6, although not specifically depicted in FIG. 8.

With the above technique, an output with the pulse width 96 is obtainable with respect to the first pixel, and an output with the pulse width 96 is also obtained for the second pixel. Regarding the third pixel and its following odd-numbered pixels, the output of PIXDAT3 will be obtained by a similar operation to that of the first pixel. As for the fourth pixel and its following even-numbered pixels, the output of PIXDAT3 will be obtained in a similar way to the second pixel.

However, the output pulses of the first and second PWMs 75-76 can sometimes vary in width due to environmental changes, such as temperature changes or else, to have larger pulse widths than expected. A typical case of it is shown in FIG. 8 under an assumption that such pulse width expansion occurs at the time of the data of fifth and tenth pixels.

As for the fifth pixel data, unwanted pulse width increment takes place so that its corresponding H-level output pulse width of PIXDAT1 becomes longer than the time length of one-pixel period T2, as indicated by dotted line in FIG. 8. Merely outputting of this signal can affect the data of neighboring pixels, resulting in lack of the ability to executing any advanced image processing. On the other hand, the first mask pulse signal SIG1 relating to the fifth pixel data has its H-level pulse width equal to the time length of one-pixel period T2. The output signal PIXDAT3 of synthetic circuit 80 has an OR'ed value of PIXDAT1 and first mask pulse signal SIG1. Thus, even if the signal PIXDAT1 is the one that can affect the neighboring pixels, masking is applied by the first mask pulse signal SIG1. This makes it possible to prevent the signal PIXDAT3 from affecting the neighboring pixels.

The same goes with the case of the tenth pixel. Masking is applied by the second mask pulse signal SIG2 even if the signal PIXDAT2 is the one that affects the neighboring pixels. This makes it possible to prevent the signal PIXDAT3 from affecting the neighboring pixels.

In the third embodiment, it is possible to achieve high-speed light emission. This can be said because two separate PWMs 75-76 are used with respect to the single LD driver 82 for accomplishment of the light emission required, wherein the PWMs are slower in drive operation than the LD driver. With this arrangement, it is also possible to perform light emission at higher speeds than arrangements for performing light emission by using one PWM per LD driver. Another advantage is an ability to achieve high-speed performance without having to increase the required number of high-priced laser diodes. In addition, using the pulse generator circuit 73 makes it possible to apply masking to the data (signal) that can affect certain portions of neighboring pixels. Thus it becomes possible to establish appropriate light emission timings, which in turn makes it possible to achieve successful image formation.

A further advantage lies in the capability to prevent the signal as output from the pulse generator circuit 73 from affecting neighboring pixels even where the PWM's output data stays at H level for a long time due to possible environmental changes such as temperature changes.

Figure 9:
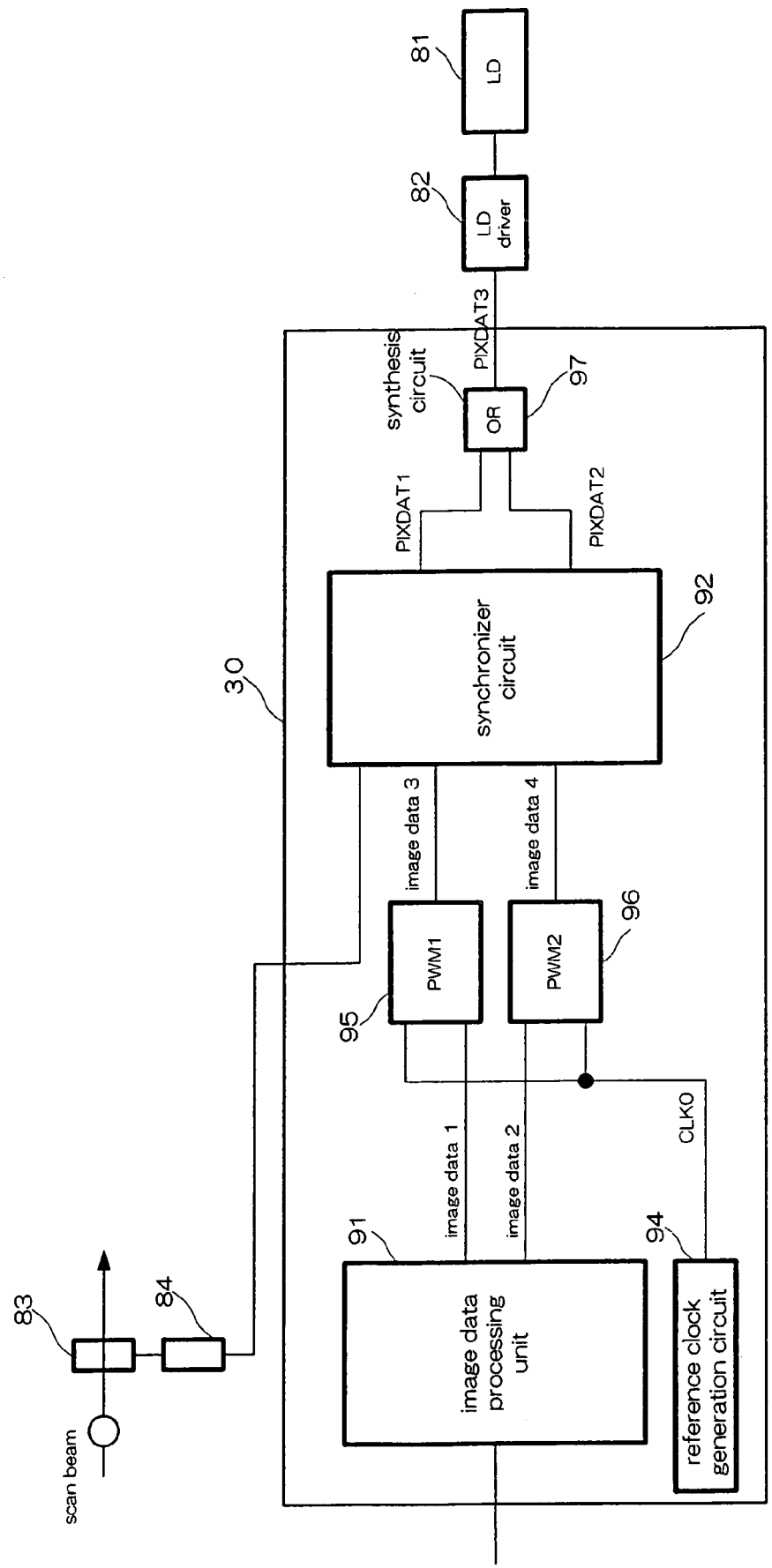
FIG. 9 shows a detailed configuration of electrical circuitry of part of a beam light scanner in accordance with a fourth embodiment of the invention.
Figure 10:
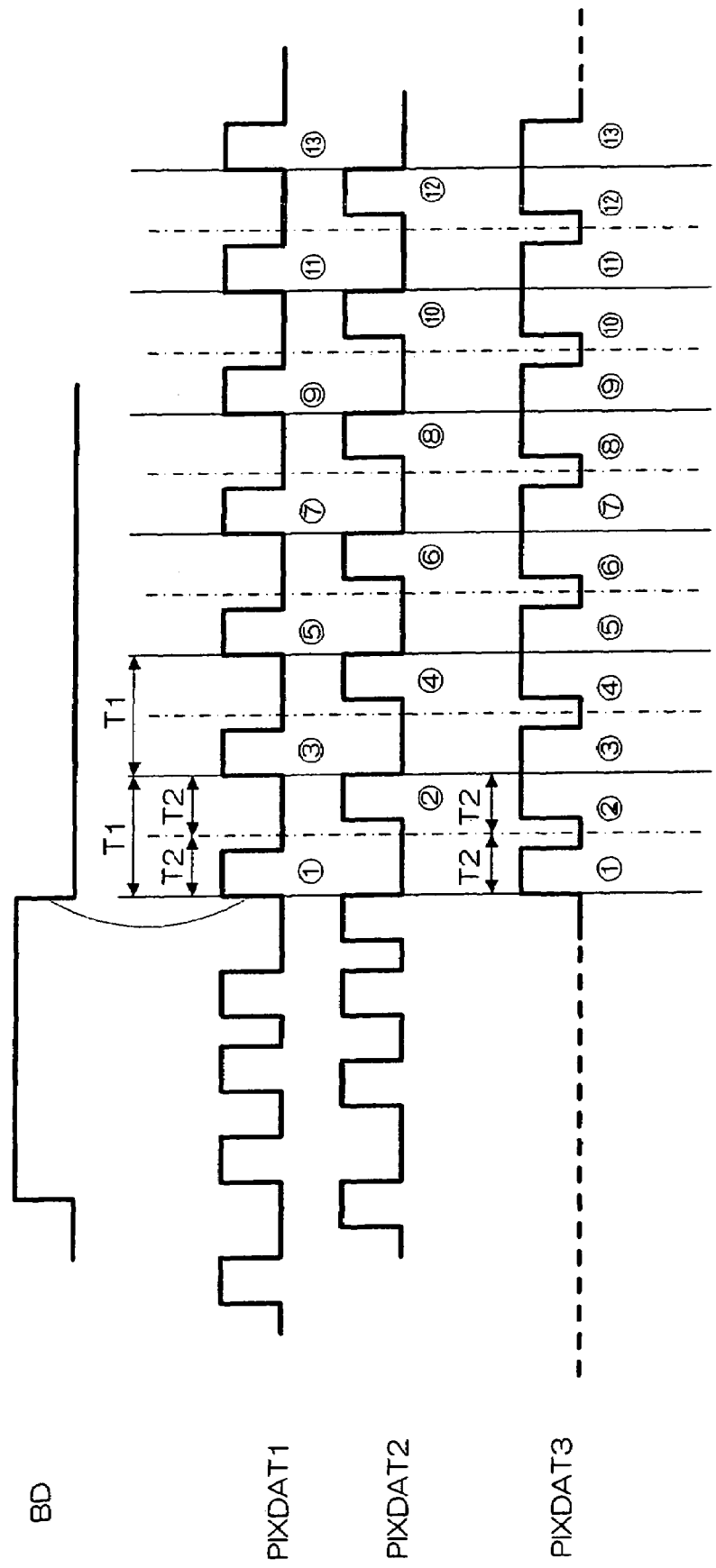
FIG. 10 is a timing chart of major pulse signals generated in the fourth embodiment.

An explanation will next be given of a fourth embodiment of the invention. Note that an entirety of image forming apparatus is similar to that shown in FIG. 1 so that like parts or components are indicated by like reference characters, with detailed explanations eliminated herein. FIG. 9 shows a detailed configuration of electrical circuitry of a laser control unit 30, which is part of a beam light scanner device. FIG. 10 is a timing chart of the third embodiment.

The laser control unit 30 shown in FIG. 9 is made up of several built-in components, which include an image data processing unit 91, a synchronizer circuit 92, and a reference clock generator circuit 94. The image data processor 91 is an image data processing means for dividing, for alternate delivery, a train of image-processed data of neighboring pixels into first pixel data and second pixel data. The synchronizer circuit 92 is a signal synchronization means for outputting the first pixel data and second pixel data in a way synchronous with a reference clock signal. The reference clock generator 94 generates at its output a clock signal for use as the reference concerning laser control processing. The laser controller 30 also includes first and second PWMs 95 and 96. The first PWM (PWM #1) 95 is a first output pulse adjustment means for adjusting an output pulse width based on a first pixel. The second PWM (PWM #2) 96 is a second output pulse adjustment means for adjusting the output pulse width based on second pixel data. The laser controller 30 further includes a synthetic circuit 97 or the like, which is a synthesis means for calculating a logical sum of the first and second pixel data as output from the synchronizer circuit 92. Note that an adjustment means is made up of the synchronizer 92, PWMs 95-96 and others.

A beam detector circuit 84 is connected to the synchronizer circuit 92. The image data processor unit 91 is connected to an image data I/F 18. Image data processor 91 is connected to the first and second PWMs 95 and 96. The reference clock generator 94 is connected to PWMs 95-96, which in turn are connected to the synchronizer circuit 92. Synchronizer 92 is connected via separate signal lines for sending the first and second pixel data to the synthetic circuit 97 respectively. Synthetic circuit 97 is coupled to a laser diode (LD) driver 82.

The image data processor 91 receives image data as input thereto via the image data I/F 18, which data may be pixel data being stored in the image memory in the image processor 15 or alternatively in the page memory 17. Image data processor 91 divides, for alternate distribution, the input pixel data into strings of pixel data which correspond to respective PWMs 95-96. In the fourth embodiment the first PWM 95 is designed to process data of odd-numbered pixels, while the second PWM 96 processes data of even-numbered pixels. The data items thus divided for distribution are then sent forth via corresponding transfer lines to corresponding PWMs. In this fourth embodiment the odd pixel data—i.e., first pixel data—is input to PWM 95 by way of a line that indicates image data #1 in FIG. 9, while the even pixel data, i.e., second pixel data, is input to PWM 96 via another line indicating image data #2.

The reference clock generator 94 is uniquely provided in the laser controller 30 in order to establish appropriate timings of laser control.

The first and second PWMs 95-96 serving as the output pulse adjustment means are each designed to perform outputting of pulse widths and setup of pulse positions in accordance with the data of respective pixels. By use of this pulse position changeable functionality, the fourth embodiment is arranged so that the pulse width is sliced into segments each having an equal width of 1/255 for providing control while using the first PWM 95 to form odd-numbered pixel data with pulse positions defined on a left-referencing basis and also using the second PWM 96 to form even-numbered pixel data with pulse positions defined on a right-reference basis. Using this scheme may provide appreciable phase separation between respective pixel data signals, thereby preventing unwanted overlap between neighboring pixels. The fourth embodiment is similar to the first embodiment in PWM's pulse width/position changing functions.

The synchronizer circuit 92 receives a horizontal sync signal BD from the beam detector circuit 84 while receiving at its inputs the first pixel data by way of a line indicating image data #3 in FIG. 10 and also the second pixel data via a line indicating image data #4. Synchronizer 92 outputs either the first pixel data or the second pixel data in a way synchronized with the horizontal sync signal BD.

The synthetic circuit 97 operates to combine or "synthesize" the first pixel data or the second pixel data as output via separate lines from the synchronizer circuit 92. The resultant combined signal is output as PIXDAT3 to the LD driver 82. The synthetic circuit 97 is typically implemented as an OR gate circuit.

An operation of the fourth embodiment will be discussed with reference to FIG. 10.

When the horizontal sync signal BD as output from the beam detector circuit 84 is input to the synchronizer circuit 92, the reference clock signal varies in period or cycle. In the fourth embodiment, when the horizontal sync signal BD potentially rises up, a reference clock signal CLK1 that is output from the synchronizer 92 is modified to have a shorter period than the PWM period T1.

When the horizontal sync signal BD potentially falls down, the pixel data PIXDAT1 that is output from the synchronizer circuit 92 rises up, and the pixel data PIXDAT2 falls down in potential. At this time the first PWM 95 is performing output of a pulse width 96 with respect to 255 sliced pulse segments in period T1 on the left-reference basis. At this time, pixel data PIXDAT3 that is output from synthetic circuit 97 is the same in waveform as PIXDAT1. In this way, pixel data corresponding to the first pixel is output from an LD module 81 of FIG. 9.

Additionally, the pixel data PIXDAT2 rises up in potential after the elapse of a time equivalent to one pixel period plus a prespecified length of time since the fall-down of the horizontal sync signal BD. At this time the second PWM 96 is performing output of the pulse width 96 with respect to 255 sliced pulse segments in period T1 period 255 of T1 on the right-reference basis. At this time the data PIXDAT3 being output from synthetic circuit 97 is the same in waveform as PIXDAT2. In this way, pixel data corresponding to the second pixel is output from the LD 81. Regarding odd-numbered pixels that come after a third pixel, output pixel data PIXDAT3 may be obtained by substantially the same procedure as that of the second pixel stated above. As for even-numbered pixels that follow a fourth pixel, output pixel data PIXDAT3 is obtainable by the same procedure as that of the second pixel. As both the last of a series of odd pixel outputs and the first of a series of even pixel outputs are at H level, outputting of data of the next pixel is performed while letting the PIXDAT3 stay at H level.

In this way, in the fourth embodiment, it is possible to realize high-speed light emission. This can be said because two PWMs 95-96 are used for the single LD driver 82 to achieve the light emission, wherein the former is less in drivability than the latter. With this arrangement, it becomes possible to perform light emission at high speeds, when compared to standard arrangements for performing light emission by using one PWM per LD driver. Another advantage is that high-speed performance is achievable without having to increase the required number of high-priced laser diodes.

It should be noted that the first to third embodiments stated supra may be modifiable to eliminate the use of the first and second AND gate circuits in the pulse generator circuit. Even in such case, it is still possible to use two PWMs to allow the laser driver to emit light, thereby making it possible to achieve the intended image forming apparatus with high-speed performance using a less number of laser diodes. If this is the case, it is deemed recommendable to provide pulse generation circuitry or else because of the lack of any masking functions even upon outputting of those signals that affect neighboring pixels.

Although in the first to fourth embodiments one specific arrangement is employed for using a couple of PWMs per LD driver, this invention should not be limited thereto. In cases where the LD driver has its data processing ability or "processability" that is four times greater than that of PWMs, four PWMs are usable per LD driver. In this way pursuant to the LD driver's processability, the number of the PWMs being connected thereto may be set up in a case-by-case basis. Additionally, although the first to fourth embodiments stated supra are drawn to the case of monochrome image formation, the principles of the invention may be applied to color image forming apparatus with full color image handleabilities. Also note that while in the first to fourth embodiments the discussion was made relating to the neighboring pixels in the main scanning direction, it would readily occur to those skilled in the art that the principles of the invention are employable to neighboring pixels in a sub-scan direction(s). The configurations used in respective embodiments may be combinable to obtain the effects and advantages of the invention.

What is claimed is:

1. A beam light scanning device comprising:
an image data processor configured to output data of neighboring pixels while dividing for distribution the data into first pixel data and second pixel data;
an adjuster device configured to perform specified adjustment with respect to the first pixel data and the second pixel data as output from said image data processor;
a synthesis device configured to combine together the adjusted first and second pixel data as output from said adjuster device;
a light emission device responsive to receipt of the pixel data as output from said synthesis device configured to emit light as a scan beam; and
a horizontal synchronous signal generator configured to generate a horizontal synchronous signal based on detection of pass-through of the scan beam as emitted from said light emission device,
wherein said adjuster device includes a signal synchronizer to synchronize a reference clock signal based on the horizontal synchronous signal as generated from said horizontal synchronous signal generator and to output the first and second pixel data in synchronism with said reference clock signal thus synchronized.

2. The device according to claim 1, wherein said adjuster device includes:
a first output pulse adjustment device configured to adjust an output pulse width based on data of the first pixel data as output from said signal synchronizer; and
a second output pulse adjustment device configured to adjust an output pulse width based on data of the second pixel data as output from said signal synchronizer.

3. The device according to claim 1, wherein said adjuster device includes:
a delay device configured to cause the second pixel data as output from said signal synchronizer to output with a delay by a specified length of time within a range equivalent to a one pixel output session.

4. The device according to claim 3, wherein said signal synchronizer comprises a first signal synchronizer configured to perform synchronization processing exclusively for the first pixel data and a second signal synchronizer configured to perform synchronization processing exclusively for the second pixel data, and
wherein said delay device receives the horizontal synchronous signal as output from said horizontal synchronous signal generator and outputs this signal toward said second signal synchronizer.

5. The device according to claim 1,
wherein said adjuster device includes a signal synchronizer configured to output said adjusted first and second pixel data in synchronism with the horizontal synchronous signal being output from said horizontal synchronous signal generator.

6. The device according to claim 1, wherein said adjuster device includes:
a data mask synthesizer configured to input the horizontal synchronous signal as output from said horizontal synchronous signal generator along with at least the second pixel data out of said first and second pixel data as output from said signal synchronizer, and to perform mask synthesis of any one of said first and second pixel data based on a signal for masking part of pixel data with affectability on neighboring pixel data.

7. A method of operating a beam light scanning device comprising:
outputting data of neighboring pixels while dividing for distribution the data into first pixel data and second pixel data;
performing specified adjustment with respect to the first pixel data and the second pixel data to provide adjusted first and second pixel data;
combining together the adjusted first and second pixel data to provide synthesized data;
emitting light as a scan beam in response to receipt of the synthesized data; and
generating a horizontal synchronous signal based on detection of pass-through of the scan beam as emitted, wherein said performing specified adjustment includes synchronizing a reference clock signal based on the horizontal synchronous signal and outputting the first and second pixel data in synchronism with said reference clock signal thus synchronized.

8. The method according to claim 7, wherein said performing specified adjustment includes:
   adjusting an output pulse width based on data of the synchronized first pixel data; and
   adjusting an output pulse width based on data of the synchronized second pixel data.

9. The method according to claim 7, wherein said performing specified adjustment includes:
   causing the synchronized second pixel data to output with a delay by a specified length of time within a range equivalent to a one pixel output session.

10. The method according to claim 9, wherein said synchronizing includes performing synchronization processing via a first signal synchronizer exclusively for the first pixel data and performing synchronization processing via a second signal synchronizer exclusively for the second pixel data, and
   wherein said causing the synchronized second pixel data to output with a delay comprises receiving the horizontal synchronous signal and outputting this signal toward said second signal synchronizer.

11. The method according to claim 7,
   wherein said performing specified adjustment includes outputting said adjusted first and second pixel data in synchronism with the horizontal synchronous signal.

12. The method according to claim 7, wherein said performing specified adjustment includes:
   inputting the horizontal synchronous signal along with at least the second synchronized pixel data out of said first and second synchronized pixel data, and performing mask synthesis of any one of said first and second synchronized pixel data based on a signal for masking part of pixel data with affectability on neighboring pixel data.

* * * * *